United States Patent
Huang

(10) Patent No.: US 12,461,749 B2
(45) Date of Patent: Nov. 4, 2025

(54) INSTRUCTION EXECUTION METHOD, PROCESSOR AND ELECTRONIC APPARATUS

(71) Applicant: Hygon Information Technology Co., Ltd., Tianjin (CN)

(72) Inventor: He Huang, Tianjin (CN)

(73) Assignee: HYGON INFORMATION TECHNOLOGY CO., LTD. (CN)

( * ) Notice: Subject to any disclaimer, the term of this patent is extended or adjusted under 35 U.S.C. 154(b) by 0 days.

(21) Appl. No.: 18/567,905

(22) PCT Filed: May 17, 2022

(86) PCT No.: PCT/CN2022/093254
§ 371 (c)(1),
(2) Date: Dec. 7, 2023

(87) PCT Pub. No.: WO2023/103287
PCT Pub. Date: Jun. 15, 2023

(65) Prior Publication Data
US 2024/0272909 A1   Aug. 15, 2024

(30) Foreign Application Priority Data

Dec. 9, 2021 (CN) .......................... 202111498042.9

(51) Int. Cl.
*G06F 9/30* (2018.01)
*G06F 9/38* (2018.01)

(52) U.S. Cl.
CPC ...... *G06F 9/30189* (2013.01); *G06F 9/30098* (2013.01); *G06F 9/3867* (2013.01)

(58) Field of Classification Search
None
See application file for complete search history.

(56) References Cited

U.S. PATENT DOCUMENTS 7,290,261 B2 * 10/2007 Burky .................. G06F 9/384
                                          718/107
8,245,016 B2   8/2012 Bybell
(Continued)

FOREIGN PATENT DOCUMENTS

CN   1306642 A   8/2001
CN   1577260 A   2/2005
(Continued)

OTHER PUBLICATIONS

Extended European Search Report dated Oct. 10, 2024 for European application No. 22902725.5, 8 pages.
(Continued)

*Primary Examiner* — Michael Sun
(74) *Attorney, Agent, or Firm* — Fox Rothschild LLP

(57) ABSTRACT

An instruction execution method, a processor and an electronic apparatus. The instruction execution method includes: switching a pipeline architecture of the processor between a first instruction execution mode and a second instruction execution mode according to a selection signal, wherein the first instruction execution mode supports N threads and is suitable for a first general-purpose register set of an instruction set; the second instruction execution mode supports M threads and is suitable for a second general-purpose register set of the instruction set, the first general-purpose register set is less than the second general-purpose register set, M and N are positive integers, and N is greater than M.

17 Claims, 6 Drawing Sheets

(56) References Cited

U.S. PATENT DOCUMENTS

| | | | | |
|---|---|---|---|---|
| 10,732,976 | B2* | 8/2020 | Robertson | G06F 9/462 |
| 2008/0250226 | A1* | 10/2008 | Eickemeyer | G06F 9/30145 |
| | | | | 712/20 |
| 2012/0221796 | A1* | 8/2012 | Tran | G06F 12/0848 |
| | | | | 711/131 |
| 2015/0347308 | A1* | 12/2015 | Venkumahanti | G06F 12/0846 |
| | | | | 711/120 |
| 2019/0065399 | A1* | 2/2019 | Guthrie | G06F 9/30079 |

FOREIGN PATENT DOCUMENTS

| | | |
|---|---|---|
| CN | 101201732 A | 6/2008 |
| CN | 114168197 A | 3/2022 |

OTHER PUBLICATIONS

Examination report for European Patent Application No. 22902725. 5, dated May 8, 2025, 8 pages.

* cited by examiner

INSTRUCTION EXECUTION METHOD, PROCESSOR AND ELECTRONIC APPARATUS

This application is a national phase filing of International Patent Application No. PCT/CN2022/093254, which claims the priority of Chinese Patent Application No. 202111498042.9 filed on Dec. 9, 2021, the disclosure of both of which are incorporated by reference herein in their entirety as part of the present application.

TECHNICAL FIELD

Embodiments of the present disclosure relate to an instruction execution method, a processor and an electronic apparatus.

BACKGROUND

To improve the performance of a processor, the processor may function in a pipeline manner. That is, the entire process of extraction, decoding, execution, and result writing for an instruction is divided into a plurality of pipeline stages, and one instruction can only be at a certain pipeline stage at one clock. However, the processor may have a plurality of instructions running at different pipeline stages.

SUMMARY

At least one embodiment of the present disclosure provides an instruction execution method for a processor, comprising: switching a pipeline architecture of the processor between a first instruction execution mode and a second instruction execution mode according to a selection signal, wherein the first instruction execution mode supports N threads and is suitable for a first general-purpose register set of an instruction set, and the second instruction execution mode supports M thread or threads and is suitable for a second general-purpose register set of the instruction set; the first general-purpose register set is smaller than the second general-purpose register set, M and N are positive integers, and N is greater than M.

For example, in an instruction execution method according to at least one embodiment of the present disclosure, switching the pipeline architecture of the processor between the first instruction execution mode and the second instruction execution mode according to the selection signal comprises: in response to a first selection sub-signal for switching from the first instruction execution mode to the second instruction execution mode, combining N first-type register renaming mapping tables for the N threads to obtain M second-type register renaming mapping tables for the M threads, and in response to a second selection sub-signal for switching from the second instruction execution mode to the first instruction execution mode, splitting the M second-type register renaming mapping tables for the M threads to obtain the N first-type register renaming mapping tables for the N threads, wherein each of the second-type register renaming mapping tables includes at least two first-type register renaming mapping tables, and the selection signal includes the first selection sub-signal and the second selection sub-signal.

For example, in an instruction execution method according to at least one embodiment of the present disclosure, switching the pipeline architecture of the processor between the first instruction execution mode and the second instruction execution mode according to the selection signal further comprises: using the selection signal to control a multiplex selection device to perform switching between the N first-type register renaming mapping tables for the N threads and the M second-type register renaming mapping tables for the M threads.

For example, in an instruction execution method according to at least one embodiment of the present disclosure, the first-type register renaming mapping tables and the second-type register renaming mapping tables are each of a random addressed memory architecture.

For example, in an instruction execution method according to at least one embodiment of the present disclosure, the first general-purpose register set is a non-extended general-purpose register set of the instruction set, and the second general-purpose register set is an extended general-purpose register set of the instruction set.

For example, in an instruction execution method according to at least one embodiment of the present disclosure, the instruction set includes a complex instruction set or a reduced instruction set.

For example, in an instruction execution method according to at least one embodiment of the present disclosure, wherein M is 1, and N is 2, 4, or 8.

For example, in an instruction execution method according to at least one embodiment of the present disclosure, a number of general-purpose registers in the first general-purpose register set is ½, ¼, or ⅛ of a number of general-purpose registers in the second general-purpose register set.

At least one embodiment of the present disclosure also provides a processor, the processor comprises a pipeline architecture and a switching unit, and the switching unit is configured to switch the pipeline architecture of the processor between a first instruction execution mode and a second instruction execution mode according to a selection signal, wherein the first instruction execution mode supports N threads and is suitable for a first general-purpose register set of an instruction set, and the second instruction execution mode supports M thread or threads and is suitable for a second general-purpose register set of the instruction set; the first general-purpose register set is smaller than the second general-purpose register set, M and N are positive integers, and N is greater than M.

For example, in a processor according to at least one embodiment of the present disclosure, the pipeline architecture comprises N first-type register renaming mapping tables for N threads, and switching the pipeline architecture of the processor between the first instruction execution mode and the second instruction execution mode according to the selection signal comprises: in response to a first selection sub-signal for switching from the first instruction execution mode to the second instruction execution mode, combining N first-type register renaming mapping tables for the N threads to obtain M second-type register renaming mapping tables for the M threads, and in response to a second selection sub-signal for switching from the second instruction execution mode to the first instruction execution mode, splitting the M second-type register renaming mapping tables for the M threads to obtain the N first-type register renaming mapping tables for the N threads, wherein each of the second-type register renaming mapping tables includes at least two first-type register renaming mapping tables, and the selection signal includes the first selection sub-signal and the second selection sub-signal.

For example, in a processor according to at least one embodiment of the present disclosure, the switching unit comprises a multiplex selection device and is configured to use the selection signal to control the multiplex selection device to perform switching between the N first-type register renaming mapping tables for the N threads and the M second-type register renaming mapping tables for the M threads.

For example, in a processor according to at least one embodiment of the present disclosure, the first-type register renaming mapping tables and the second-type register renaming mapping tables are each of a random addressed memory architecture.

For example, in a processor according to at least one embodiment of the present disclosure, wherein M is 1, and N is 2, 4, or 8.

For example, in a processor according to at least one embodiment of the present disclosure, a number of general-purpose registers in the first general-purpose register set is ½, ¼, or ⅛ of a number of general-purpose registers in the second general-purpose register set.

At least one embodiment of the present disclosure also provides an electronic apparatus, comprising the processor according to any of the above embodiments.

BRIEF DESCRIPTION OF THE DRAWINGS

To describe the technical solutions of the embodiments of the present disclosure more clearly, the accompanying drawings for the embodiments will be introduced below briefly. Apparently, the accompanying drawings in the following description merely involve some embodiments of the present disclosure and are not limiting of the present disclosure.

DETAILED DESCRIPTION

To make the objective, technical solutions, and advantages of the embodiments of the present disclosure clearer, the technical solutions of the embodiments of the present disclosure will be described below clearly and completely with reference to the accompanying drawings in the embodiments of the present disclosure. Apparently, the described embodiments are a part rather than all of the embodiments of the present disclosure. All other embodiments derived from the described embodiments of the present disclosure by those of ordinary skill in the art without creative efforts shall fall within the protection scope of the present disclosure.

Unless otherwise defined, the technical and scientific terms used herein are as they are usually understood by those skilled in the art to which the disclosure pertains. "First", "second", and similar words used in the present disclosure do not denote any order, quantity, or importance, but are merely intended to distinguish between different constituents. Likewise, "Comprising", "including", and similar words mean that elements or articles appearing before "comprising" or "including" include the elements or articles and their equivalent elements appearing behind "comprising" or "including", not excluding any other elements or articles. "Connecting", "connected", and similar words are not restricted to physical or mechanical connections, but may include electrical connections, whether direct or indirect. "Upper", "lower", "left", "right", and the like are used merely to indicate a relative positional relationship, and when the absolute position of the described object is changed, the relative positional relationship is also changed accordingly.

Figure 1A:
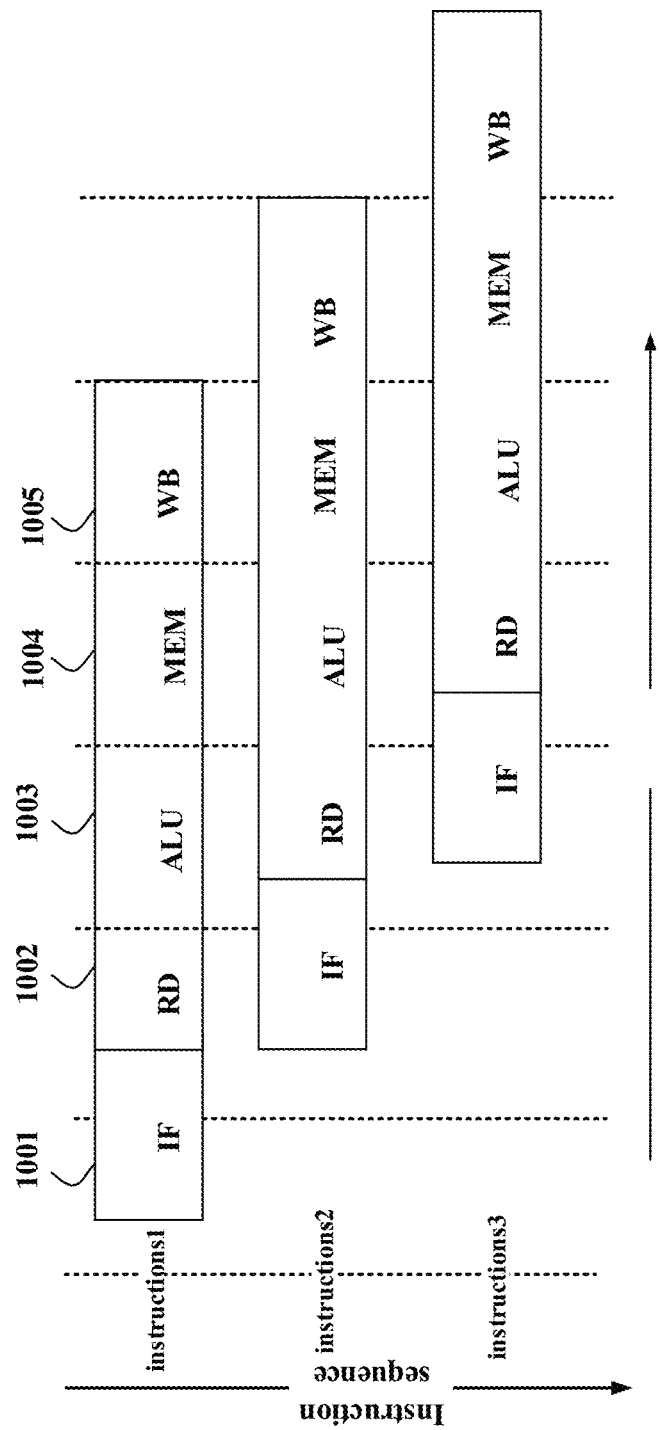
FIG. 1A illustrates an instruction pipeline of an exemplary scalar central processing unit (CPU)

FIG. 1A illustrates an instruction pipeline of an exemplary scalar CPU. The instruction pipeline includes five stages, wherein each instruction may be dispatched in each clock cycle and executed within a fixed time (e.g., 5 clock cycles). The execution of each instruction is divided into 5 stages: an instruction fetch (IF) stage 1001, a read register (RD) (or decoding stage) 1002, an arithmetic/logic unit (ALU) stage (or execution stage) 1003, a memory (MEM) stage 1004, and a write-back (WB) stage 1005. In the IF stage 1001, a specified instruction is fetched from an instruction cache. A part of the fetched specified instruction is used for specifying a source register available for executing the instruction. In the RD stage 1002, decoding is performed and a control logic is generated, and a content of the specified source register is fetched. Arithmetic or logic operation is performed in the ALU stage 1003 using the fetched content according to the control logic. in the MEM stage 1004, the instruction is executed to read/write a memory in a data cache. Finally, in the WB stage 1005, a value obtained by executing the instruction may be written back to a certain register.

Figure 1B:
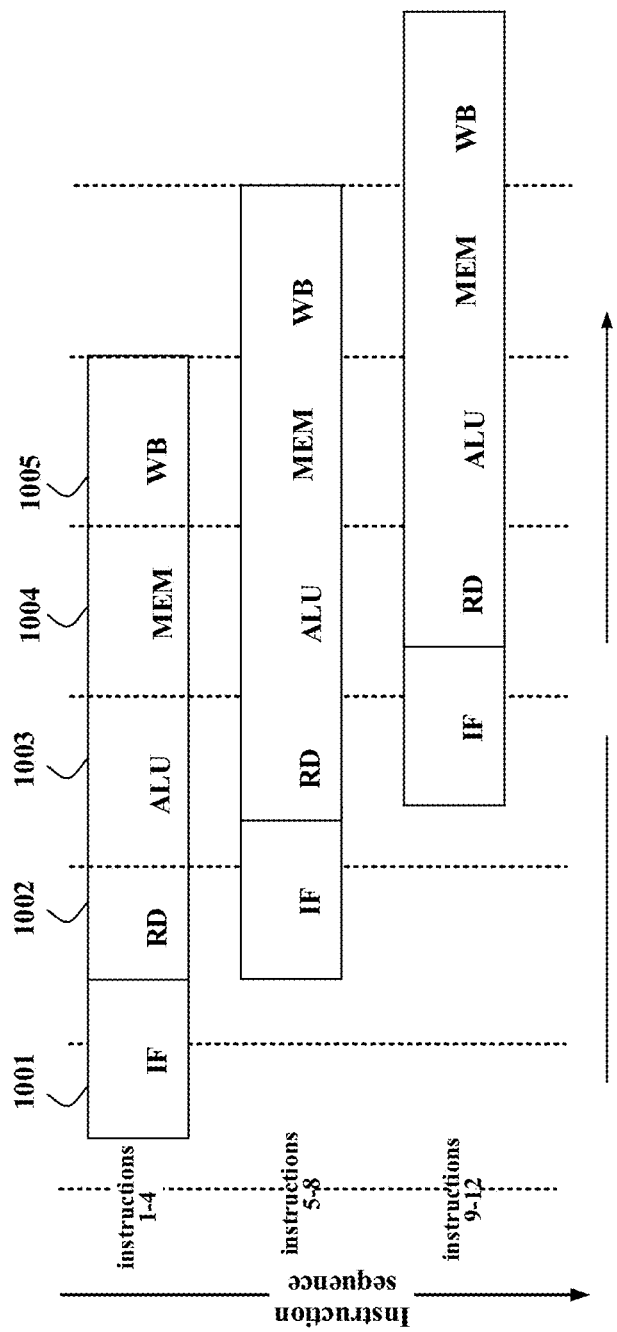
FIG. 1B illustrates an instruction pipeline of an exemplary superscalar CPU.

Taking a conventional scalar pipeline shown in FIG. 1A for example, a number of instructions averagely executed per clock cycle is less than or equal to 1, i.e., its instruction level parallelism is less than or equal to 1. Superscalar refers to a method for executing a plurality of instructions in parallel within one cycle that has increased instruction level parallelism. A processor capable of processing a plurality of instructions within one cycle is called a superscalar processor. The superscalar processor has additional resources added on the basis of a common scalar processor and creates a plurality of pipelines, each of which performs an instruction assigned thereto, thereby realizing parallelism. FIG. 1B illustrates an instruction pipeline of an exemplary superscalar processor. Four instructions may be input in parallel at each level in the pipeline. For example, instructions 1-4 are processed in parallel, instructions 5-8 are processed in parallel, and instructions 9-12 are processed in parallel. For the conventional scalar pipeline shown in FIG. 1B, the number of instructions averagely executed per clock cycle is greater than 1, i.e., its instruction level parallelism is greater than 1.

For example, the superscalar processor may further support out-of-order execution. The out-of-order execution refers to the processor adopting a technique in which a plurality of instructions are allowed to be separately sent, not in the programmed order, to corresponding circuit units for processing. The out-of-order execution involves many algorithms, and these algorithms are basically designed on the basis of reservation stations. The core idea of the reservation stations is that decoded instructions are sent to respective reservation stations for storage according to respective instruction types, and if all operands for the instructions are ready, out-of-order transmission can be started.

The pipeline shown in FIG. 1B may be very smooth when executing a simple instruction sequence, and one instruction may be executed per clock cycle. However, the instruction sequence in a program is not always a simple sequence and correlations between instructions usually exist. These correlations may cause a conflict and even an error in pipeline execution. At present, the pipeline may be mainly affected by the following three conflict types: resource conflict (structural correlation), data conflict (data correlation), and control conflict (control correlation).

In the program, if two instructions access a same register or memory address, and at least one of the two instructions is a write instruction, the two instructions are in data correlation with each other. The data correlation may be distinguished between three cases by the order of reading and writing in conflict access: RAW (read after write), WAW (write after write), and WAR (read after write). For RAW, a subsequent instruction needs to use data written previously, which is also referred to as true correlation; for WAW, two instructions are intended to write for a same target address, which is also referred to as output correlation; and for WAR, a subsequent instruction overrides a target address read by a previous instruction, which is also referred to as inverse correlation. Potential pipeline conflicts for WAW and WAR may be solved by the register renaming technique.

Similarly, to improve the parallelism, the processor may also adopt the simultaneous multi-threading (SMT) technique in which the pipeline architecture (also referred to as "pipeline" for short) for instruction execution of the processor supports two or more (e.g., 4 or 8) threads for simultaneous execution. In the pipeline of the processor supporting SMT, computing resources are shared by a plurality of threads. For example, each thread has a respective independent logic register. Among various controlling queues of the pipeline, some are shared by a plurality of threads, such as an instruction scheduling queue, and some are statically divided between a plurality of threads, such as an instruction reranking queue. The SMT technique may increase the pipeline resource utilization rate by means of the parallelism between threads.

Figure 1C:
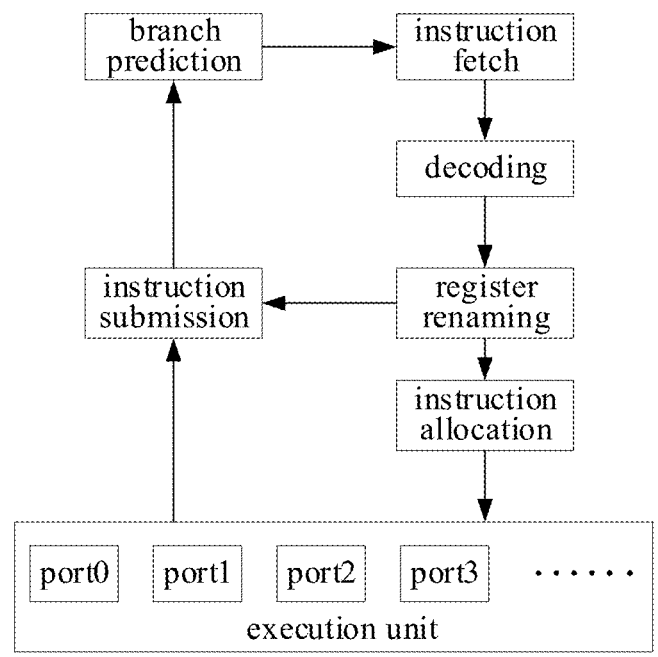
FIG. 1C illustrates a schematic diagram of a pipeline of a processor involving out-of-order execution and register renaming.

FIG. 1C illustrates a schematic diagram of a pipeline of a processor involving out-of-order execution and register renaming. As shown in FIG. 1C, after each instruction (e.g., branch instruction) in the processor is fetched from the instruction cache according to a program counter (PC), the fetched instruction is decoded. The decoded instructions are subjected to register renaming for out-of-order execution to remove spurious correlation between the instructions. The instructions then enter an instruction dispatching module that determines when the instructions are dispatched to what execution units for execution. For example, at different times, the instructions will be dispatched to different execution units (e.g., ALU, a multiplication unit, a division unit, a loading unit, and a storing unit) corresponding to different ports (port 0, port 1, port 2, port 3, etc.) for execution. At the same time of register renaming, the instructions may enter an instruction submission unit that records an original instruction fetching order of the instructions. The instruction submission unit is configured to submit the instructions according to the original instruction fetching order after the completion of instruction execution and to update actual execution information of branch instructions to a branch prediction unit.

An instruction set (ISA) suited to a computer includes a complex instruction set (CISC) and a reduced instruction set (RISC). Generally, an instruction set which is not fixed in instruction length, rich in instruction operand, and strong in single instruction function is called a complex instruction set (CISC); and an instruction set which is not fixed in instruction length and concise in single instruction function is called a reduced instruction set (RISC). Typical instruction sets include ARM, X86, POWER, RISCV, and MIPS. Among these typical instruction sets, X86 is a COMPLEX INSTRUCTION SET, and ARM, POWER, RISCV, and MIPS are RISCs.

Different instruction sets are different in instruction set content definition. For example, in terms of a number of fixed-point general-purpose registers, the X86 instruction set has 16 general-purpose registers (GPRs); and ARMv8 instruction set has 31 general-purpose registers (R0 to R30) and a stack pointer (SP) register. For example, the X86 instruction set has 16 general-purpose registers in 64-bit mode: RAX, RCX, RDX, RBX, RSP, RBP, RSI, RDI, and R8 to R15, where RAX, RCX, RDX, and RBX are encoded as 000, 001, 010, and 011 in instructions.

The number of general-purpose registers has direct influence on the performance of a compiler generating target codes. When there are few general-purpose registers for an instruction set, target codes generated by the compiler may have more codes for exchanging data with the memory, which is called spill/refill in compiling technical terms. At a compiling optimization stage, redundant code elimination uses the general-purpose registers to store computing results to avoid same data from being computer for a plurality of times. When there are few general-purpose registers, the redundant code elimination is restricted.

As described above, if there are few fixed-point general-purpose registers for an instruction set, available register space when the compiler generates target codes will be limited. As a result, data is extra stored temporarily in the memory to release registers and data is loaded from the memory to recover registers. general-purpose registers are increased for an instruction set, thereby providing more register resources for the complier to generate target codes. This is conducive to improving the quality of the target codes. For example, the number of the instruction fixed-point general-purpose registers of the X86 instruction set may be increased from 16 to 32. That is, in addition to the currently known 16 fixed-point general-purpose registers RAX, RBX, RCX, RDX, RDI, RSI, RBP, RSP, R8, and R9 to R15, extra 16 general-purpose registers R16 and R17 to R31 are added. For an extended general-purpose register set and a non-extended general-purpose register set of an instruction set, the functions of the instructions of the instruction set itself remain unchanged, and only the number of the general-purpose registers usable for source operands and/or destination operands is increased.

In a processor supporting SMT, the pipeline of the processor may simultaneously execute a plurality of instructions belonging to different threads, and therefore, a thread context needs to be maintained for each thread. The thread context includes fixed-point general-purpose register information for the thread, and other X86 instruction defined program running environment, including a floating-point register, a control register, etc. When a processor supports a large number of threads, increasing the number of fixed-point general-purpose registers for an instruction set will result in that the entire multi-threaded processor needs to support a large number of general-purpose registers. When the number of general-purpose registers for an instruction set is increased from 16 to 32, 16 general-purpose registers are added for each thread. 64 general-purpose registers are added for a four-threaded processor, and finally, there are total 128 general-purpose registers. If compared with a two-threaded processor before extension of general-purpose registers for an instruction set, the two-threaded processor originally has 16*2 (32) general-purpose registers, the number of general-purpose registers in a four-threaded processor after the number of the general-purpose registers for the instruction set is increased is 4 times (128/32) that of the two-threaded processor. It thus can be seen that simultaneously increasing the number of the general-purpose registers for the instruction set and the number of the threads of the processor will result in an increase in hardware resources required.

As described above, potential pipeline conflicts for WAW and WAR may be solved by the register renaming technique. This technique does not increase the number of general-purpose registers, and therefore, a physical register (PR) is redefined within a processor by using renaming of pipeline hardware management. A register defined in an instruction set is referred to as a logic register (LR). LRs actually exist in the processor, which, for example, are generally referred to as a physical register file (PRF). The processor will dynamically map an LR to a PR to solve the problem of a correlation between WAW and WAR. The processor completes the process of register renaming through a renaming mapping table and an idle register list. When the processor performs register renaming on registers (LRs) used in the current instruction, the processor needs to perform processing on a source register and a destination register (both of which are LRs) in the instruction. For the source register, the processor may look up the renaming mapping table to find a corresponding PR No. (PRN). For the destination register, a PRN needs to be read from the idle register list, and a mapping relationship may be established between the PRN and the destination register and written in the renaming mapping table. If the idle list is empty, the pipeline of the processor needs to be suspended until an instruction retires and a PR is released.

The renaming mapping table is implemented by, for example, a hardware structure such as a storage device (e.g., a cache or a register), and its organization architecture may include, for example, the following two organization architectures:

Random Addressed Memory (RAM), storing the mapping relationship of each LR with the LR as an index, where a number of entries is equal to the number of LRs; and Content Addressed Memory (CAM), storing the mapping relationship of each PR with the PR as an index, where a number of entries is equal to the number of PRs.

In the CAM architecture, since one LR may be in mapping relationship with a plurality of PRs, a flag bit needs to be added for each entry in the table, where the flag bit represents whether the mapping relationship is the latest. A register renaming mapping table of the RAM architecture has a smaller number of entries (because the number of PRs is greater than that of LRs) and is more suitable for a processor for out-of-order execution. An exemplary register renaming mapping table (also referred to as RegMap table for short) of the RAM architecture for the X86 instruction set is as shown in Table 1.

TABLE 1

| LR Index[3:0] | PR PRN[7:0] |
|---|---|
| RAX | 128 |
| RCX | 87 |
| RDX | 3 |

TABLE 1-continued

| LR Index[3:0] | PR PRN[7:0] |
|---|---|
| RBX | 223 |
| RSP | 47 |
| RBP | 186 |
| RSI | 123 |
| RDI | 29 |
| R8 | 77 |
| R9 | 203 |
| R10 | 163 |
| R11 | 92 |
| R12 | 81 |
| R13 | 23 |
| R14 | 77 |
| R15 | 31 |

The above-mentioned exemplary register renaming mapping table has 16 entries, and the number of the entries of the table is the number of the general-purpose registers for the X86 instruction set. Storage space occupied by the register renaming mapping table includes an index column, a PRN column, and the like. For example, the register renaming mapping table may also include other possible columns, e.g., a MetaData column (not shown). Here, the index column Index[3:0] represents LRs, and PRN[7:0] represents physical register numbers (PRNs). The register renaming mapping table dynamically changes according to execution of instructions. From the above-mentioned exemplary register renaming mapping table, it can be known that at the current time, the PR corresponding to the RAX register, is No. 128 PR. A plurality of general-purpose registers may be mapped to one PR. For example, the general-purpose registers R8 and R14 in the table are both mapped to the PR 77.

As described above, in the processor supporting SMT, the pipeline of the processor may simultaneously execute a plurality of instructions belonging to different threads, and therefore, a thread context needs to be maintained for each thread. For example, in a processor supporting simultaneous two-threading, register renaming mapping tables are implemented for thread T0 and thread T1 of two threads, respectively, and maintained during operation. Thus, the thread T0 has its own independent register renaming mapping table, which may be denoted as RegMapT0 table; and the thread T1 has its own independent register renaming mapping table, which may be denoted as RegMapT1 table. The two threads may share a same group of PRs. However, it needs to be set such that different LRs in the register renaming mapping tables of the two threads may not be mapped to a same PR, although different LRs in the single register renaming mapping table may be mapped to a same PR.

The processor supporting simultaneous two-threading may run in a two-threading mode or a single-threading mode with the two-threading mode being disabled. When the processor runs in the single-threading mode, only one thread is visible to an operating system running on the processor, and the pipeline of the processor may perform operations such as instruction fetching, instruction decoding, register renaming, instruction dispatching, instruction execution, and instruction exiting on the thread T0, and correspondingly includes corresponding operating units (logic circuits) and queues. However, the resources for the thread T1 in the pipeline are in an idle state, and the hardware logic does not operate. For example, the corresponding hardware logic of the register renaming mapping table of the thread T1 is in the idle state.

The present disclosure provides an instruction execution method for a processor. The instruction execution method includes: switching a pipeline architecture of the processor between a first instruction execution mode and a second instruction execution mode according to a selection signal. The first instruction execution mode supports N threads and is suitable for a first general-purpose register set of an instruction set, and the second instruction execution mode supports M thread or threads and is suitable for a second general-purpose register set of the instruction set. The first general-purpose register set is smaller than the second general-purpose register set. M and N are positive integers, and N is greater than M.

An embodiment of the present disclosure provides a processor including a pipeline architecture and a switching unit. The switching unit is configured to switch the pipeline architecture of the processor between a first instruction execution mode and a second instruction execution mode according to a selection signal. Likewise, the first instruction execution mode supports N threads and is suitable for a general-purpose register set of an instruction set, and the second instruction execution mode supports M thread or threads and is suitable for second general-purpose register set of the instruction set. The first general-purpose register set is smaller than the second general-purpose register set. M and N are positive integers, and N is greater than M.

The foregoing embodiments of the present disclosure have no limitation on the pipeline architecture of the processor as long as it can support the SMT technique and the corresponding instruction set may have different general-purpose register sets in different instruction execution modes. By switching between the first instruction execution mode and the second instruction execution, the mode can be better selected according to the specific conditions of the running program, and the resources of the processor (pipeline) can be utilized more efficiently.

One or more embodiments are described below to help understanding.

Figure 2:
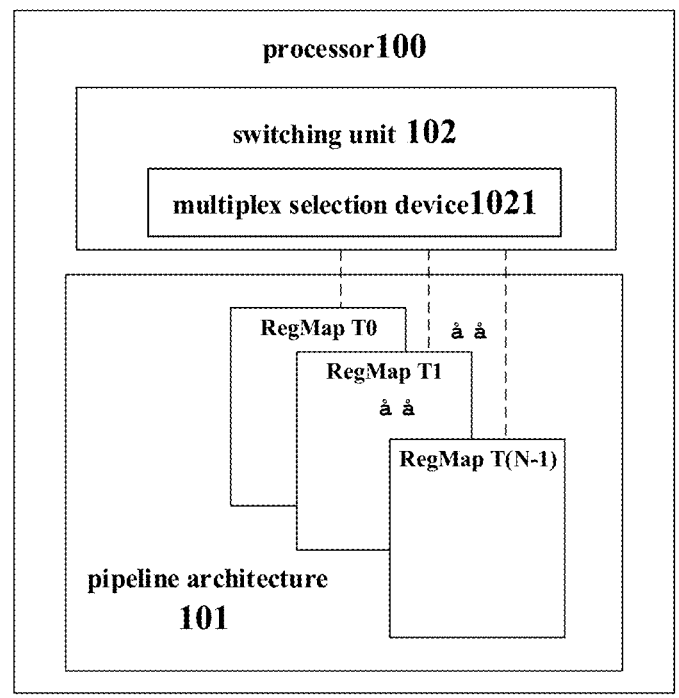
FIG. 2 illustrates a schematic diagram of a processor according to at least one embodiment.

FIG. 2 illustrates a schematic diagram of a processor according to at least one embodiment. As shown in FIG. 2, the processor 100 includes a pipeline architecture 101 and a switching unit 102.

The pipeline architecture 101 is configured for instruction execution. For example, it can support the SMT technique, and the corresponding instruction set has a non-extended general-purpose register set and an extended general-purpose register set. The pipeline architecture 101 is configured to be capable of having a plurality of instruction execution modes, and these instruction modes include a first instruction execution mode and a second instruction execution mode. The switching unit 102 is configured to switch the pipeline architecture of the processor between the first instruction execution mode and the second instruction execution mode according to a selection signal. For example, the selection signal may be automatically generated by the processor according to the condition (load) of the currently executed program. The first instruction execution mode supports N threads and is suitable for a first general-purpose register set of an instruction set, and the second instruction execution mode supports M thread or threads and is suitable for a second general-purpose register set of the instruction set. The first general-purpose register set is smaller than the second general-purpose register set. M and N are positive integers, and N is greater than M.

For the first instruction execution mode and the second instruction execution mode, the first general-purpose register set is smaller than the second general-purpose register set. Therefore, the instruction set of the process of this embodiment may have different general-purpose register sets in different modes, e.g., the non-extended general-purpose register set (a conventional general-purpose register set) and an extended general-purpose register set.

For example, the first instruction execution mode and the second instruction execution mode are both SMT modes. That is, M and N are integers of greater than 1. For example, M=2, and N=4 or 8; or, M=4 and N=8. Optionally, the first instruction execution mode is the SMT mode, and the second instruction execution mode is a single-threading mode. That is, M=1 and N is an integer greater than 1. For example, N is 2, 4, 8, or the like.

For example, for a four-threading mode and a two-threading mode (M=2 and N=4), if the four-threading mode is switched to the two-threading mode, two threads are actually disabled and idle, and then the resources of the two idle threads may be used by another two active threads. Thus, the resources of the two active threads are increased (even doubled).

For another example, the four-threading mode may be switched to a three-threading mode (M=3 and N=4). In the three-threading mode, one thread is idle, and the resource of the idle thread may be used for another three threads currently in the operating state. Therefore, switching can be performed between the three-threading and four-threading modes.

As described above, the instruction set of the processor of the embodiment may have different general-purpose register sets in different modes. For example, it may be suited to the non-extended general-purpose register set (i.e., the conventional general-purpose register set) and the extended general-purpose register set in the multi-threading mode, and may also be suited to the non-extended general-purpose register set (i.e., the conventional general-purpose register set) and the extended general-purpose register set in the single-threading mode. For example, when M=1 and N is an integer greater than 1, for example, N is 2, 4, 8, or the like, a number of general-purpose registers in the first general-purpose register set is ½, ¼, or ⅛ of a number of general-purpose registers in the second general-purpose register set.

The pipeline architecture 101 of the processor of the foregoing embodiment may include, for example, structural units such as instruction fetching, instruction decoding, register renaming, instruction dispatching, instruction execution, and instruction exiting units. Each structural unit includes a corresponding logic circuit part (e.g., if needed, may further include a storage queue). Moreover, the pipeline architecture 101 may further include, for example, a structural unit such as a branch prediction unit as needed, and includes at least a structural unit such as a first-level cache (e.g., L1 cache, L2 cache), and a data or instruction fetching unit as needed. The processor may be a multi-core processor or a single-core processor, and each processing core may include the pipeline architecture described above. The processor may be suited to a complex instruction set (CISC) or a reduced instruction set (RISC). The embodiments of the present disclosure have no limitations on the composition of the pipeline architecture itself, whether the processor has a plurality of cores, and the type of suitable instructions as long as the SMT technique can be supported and the corresponding instruction set may have different general-purpose register sets in different modes.

For example, as shown in FIG. 2, the pipeline architecture 101 includes N first-type register renaming mapping tables RegMapT0 to RegMapT(N−1) for N threads, where N is an integer greater than 1. That is, when the processor of this embodiment is in the state of supporting simultaneous N-threading, register renaming mapping tables (the first-type register renaming mapping tables) RegMapT0 to RegMapT(N−1) are implemented for thread T0 to thread TN of the N threads, respectively, and maintained during operation. That is, each thread has its own independent register renaming mapping table. For example, the N threads may share a same group of PRs.

That is, when the processor of this embodiment is in the state of supporting simultaneous M-threading, register renaming mapping tables (the second-type register renaming mapping tables) are implemented for thread T0' to thread TM' of the M threads, respectively, and maintained during operation. That is, each thread has its own independent register renaming mapping table. For example, the M threads may share a same group of PRs. Moreover, M second-type register renaming mapping tables for the M threads are obtained by combining the N first-type register renaming mapping tables. In other words, the M second-type register renaming mapping tables for the M threads are split to obtain the N first-type register renaming mapping tables for the N threads. For example, each second-type register renaming mapping table corresponds to a plurality of first-type register renaming mapping tables. For example, when M=1 and N=2, each second-type register renaming mapping table corresponds to two first-type register renaming mapping tables.

Therefore, the switching unit 102 is configured to: switch the pipeline architecture of the processor between the first instruction execution mode and the second instruction execution mode according to the selection signal; in response to a first selection sub-signal for switching from the first instruction execution mode to the second instruction execution mode, combine the N first-type register renaming mapping tables for the N threads to obtain the M second-type register renaming mapping tables for the M threads; or, in response to a second selection sub-signal for switching from the second instruction execution mode to the first instruction execution mode, split the M second-type register renaming mapping tables for the M threads to obtain the N first-type register renaming mapping tables for the N threads. Therefore, in this case the selection signal includes the first selection sub-signal and the second selection sub-signal. For example, the selection signal is a 1-bit signal. For example, one register may be used to store the selection signal. For example, the value of the first selection sub-signal is "0" and the value of the second selection sub-signal is "1", and the register used to store the selection signal may be, for example, referred to as a "processor mode register".

For example, as shown in FIG. 2, the switching unit 102 includes a multiplex selection device 1021 and is configured to use selection signal to the control multiplex selection device 1021 to perform switching between the N first-type register renaming mapping tables for the N threads and the M second-type register renaming mapping tables for the M threads.

In the processor of the forgoing embodiment, the architecture of the register renaming mapping table is not limited, which may be a RAM architecture or a CAM architecture. For example, the first-type register renaming mapping table and the second-type register renaming mapping table are both of the RAM architecture.

The following specific description is made by taking for example that the simultaneous two-threading processor is used and the suitable instruction set is the CISC (e.g., X86 instruction set). As a matter of course, as described above, the embodiments of the present disclosure may be applied to an SMT processor with a greater number of threads and suited to other instruction sets (e.g., RISC, such as ARM instruction set).

In 64-bit mode, the conventional (non-extended) general-purpose register set of the X86 instruction set includes 16 fixed-point general-purpose registers (GPR): RAX, RCX, RDX, RBX, RSP, RBP, RSI, RDI, and R8 to R15. The (non-extended) general-purpose register set of the X86 instruction set includes 32 fixed-point general-purpose registers. That is, in addition to the existing 16 fixed-point general-purpose registers RAX, RBX, RCX, RDX, RDI, RSI, RBP, RSP, R8, and R9 to R15, extra 16 general-purpose registers R16 and R17 to R31 are added.

The simultaneous two-threading processor is capable of simultaneously processing instructions of two threads in a two-threading mode, and the two threads are referred to as thread T0 and thread T1, respectively. Moreover, the processor may also run in a single-threading mode, and in the single-threading mode, the processor only makes the thread T0 visible to an operating system running on the processor. The simultaneous two-threading processor is switchable between the single-threading mode and the two-threading mode according to a selection signal (a processor mode selection signal).

Figure 3A:
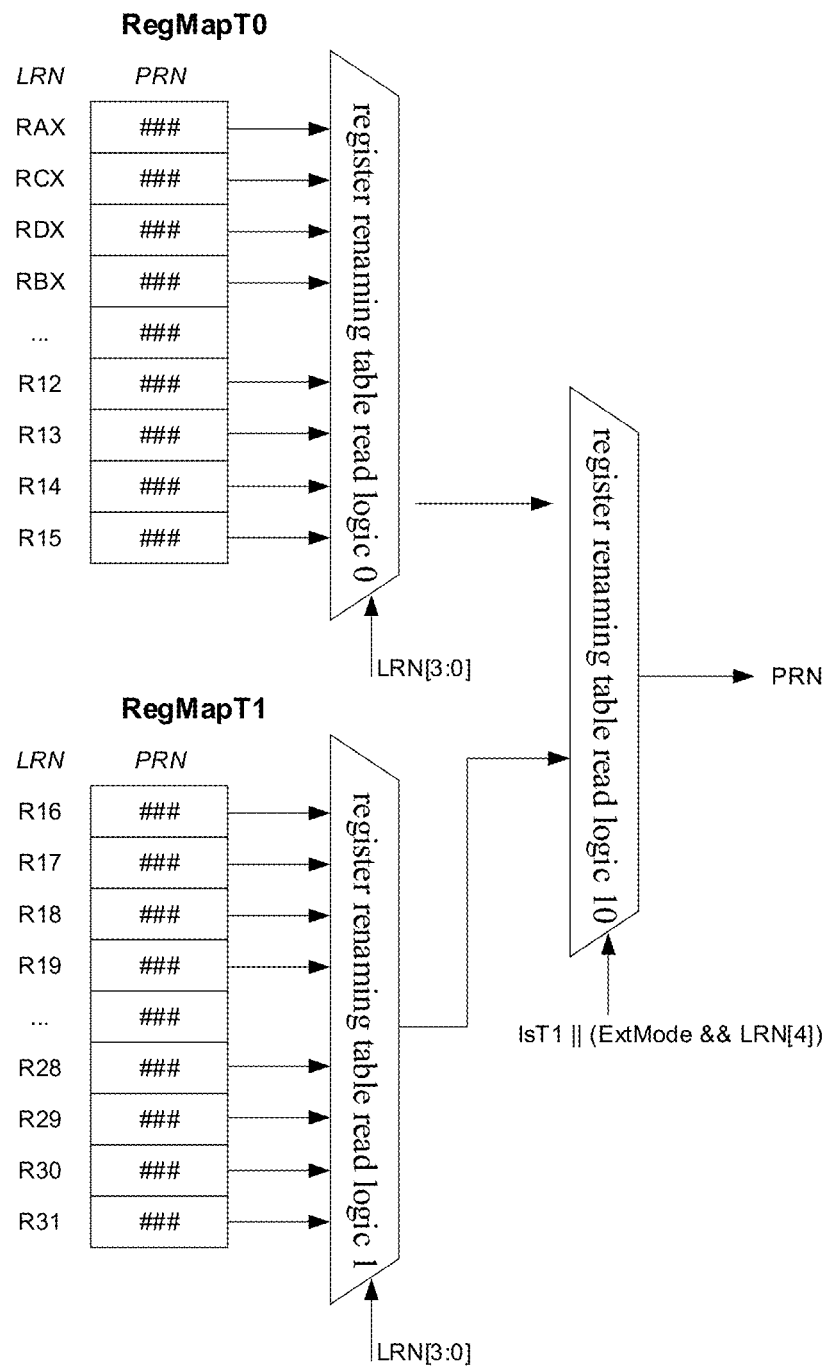
FIG. 3A illustrates a control logic of a register renaming mapping table when a processor operates in a two-threading mode according to an example of the present disclosure.
Figure 3B:
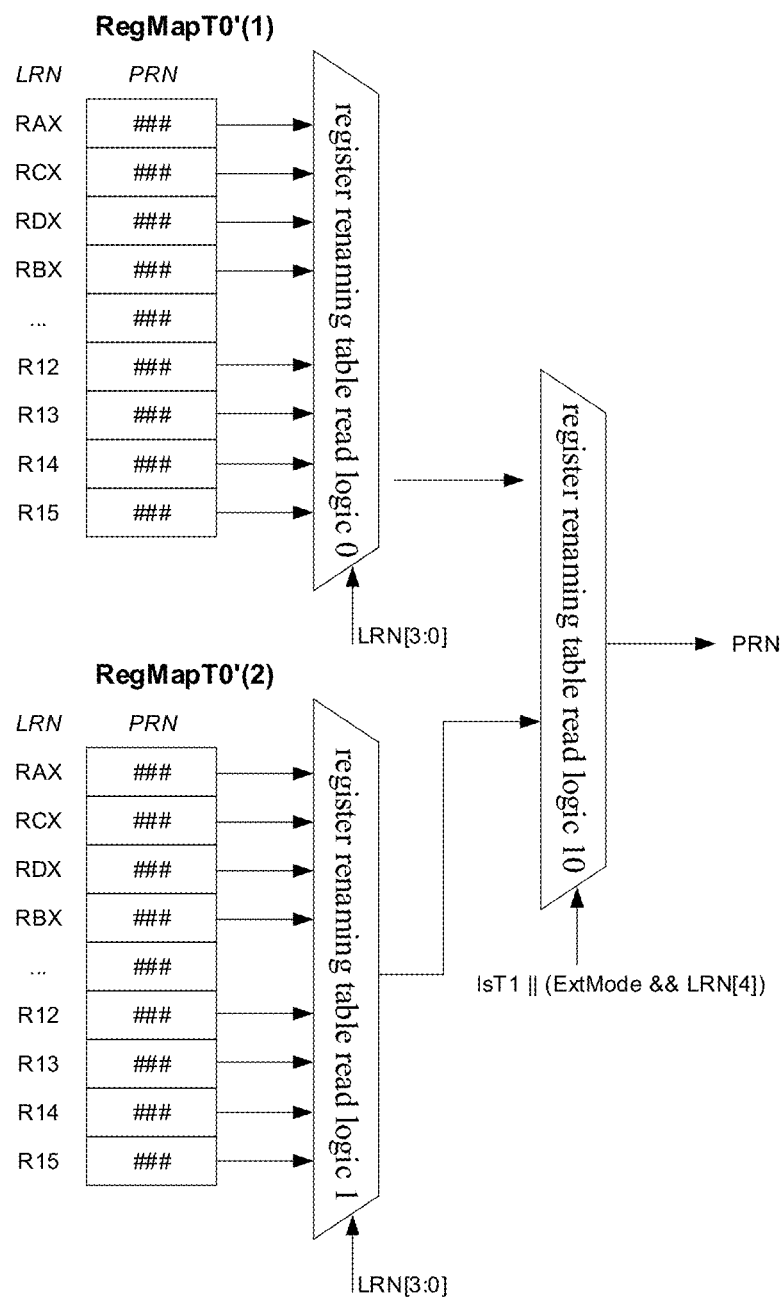
FIG. 3B illustrates a control logic of a register renaming mapping table when the processor shown in FIG. 3A operates in a single-threading mode.

FIG. 3A illustrates a control logic of a register renaming mapping table when a processor operates in a two-threading mode according to an example of the present disclosure; and FIG. 3B illustrates a control logic of a register renaming mapping table when the processor shown in FIG. 3A operates in a single-thread mode.

As shown in FIG. 3A, when the processor operates in the two-threading mode and is suited to a non-extended general-purpose register set, thread T0 and thread T1 use the conventional (non-extended) general-purpose register set of the X86 instruction set. The thread T0 and the thread T1 have their own register renaming mapping tables RegMapT0 and RegMapT1, respectively. The register renaming mapping tables RegMapT0 and RegMapT1 are both of the RAM architecture and each has 16 entries corresponding to 16 fixed-point general-purpose registers RAX, RBX, RCX, RDX, RDI, RSI, RBP, RSP, R8, and R9 to R15.

The register renaming mapping table RegMapT0 is controlled by register renaming table read logic 0, and the register renaming table read logic 0 selects a corresponding entry according to a value of an input read signal LRN[3:0]. The register renaming mapping table RegMapT1 is controlled by register renaming table read logic 1, and the register renaming table read logic 1 selects a corresponding entry according to a value of the input read signal LRN[3:0] (i.e., lower 4 bits, i.e., bit 0 to bit 3, of a register addressing signal). For example, when LRN[3:0] is 0011, the third entry (i.e., RBX) in the register renaming mapping table is selected. For another example, when LRN[3:0] is 1111, the 16th entry (i.e., R15) in the register renaming mapping table is selected. Outputs of the register renaming table read logic 0 and the register renaming table read logic 1 are controlled by register renaming table read logic 10, and the register renaming table read logic 10 gives an output according to an input read signal "IsT1||(ExtMode && LRN[4])". The above-mentioned register renaming table read logics 0, 1, and 10 are performed by the multiplex selection device separately. The above-mentioned read signal includes three parts, namely IsT1, ExtMode, and LRN[4].

When the value of IsT1 is "0", it represents that the register renaming mapping table RegMapT0 corresponding to the thread T0 is selected, and when the value is "1", it represents that the register renaming mapping table RegMapT1 corresponding to the thread T1 is selected.

When the value of ExtMode is "0", it represents that the current processor is in the two-threading mode and suited to the non-extended general-purpose register set, and when the value is "1", it represents that the current processor is in the single-threading mode and suited to the extended general-purpose register set.

When LRN[4] (the fourth bit of the register addressing signal) is "0", it represents that in the single-threading mode, the first 16 general-purpose registers of the extended general-purpose register set of the instruction set are selected, and when the value is "1", it represents that the last 16 general-purpose registers of the extended general-purpose register set of the instruction set are selected.

Therefore, for "IsT1||(ExtMode && LRN[4])", when the current processor operates in the two-threading mode and is suited to the non-extended general-purpose register set, the value of ExtMode is "0", (ExtMode && LRN[4]) is "0", and therefore, "IsT1||(ExtMode && LRN[4])" is equivalent to IsT1 itself. When IsT1 is "0", the register renaming table read logic 10 selects to output the selected entry (i.e., PRN) in the register renaming mapping table RegMapT0. When IsT1 is "1", the register renaming table read logic 10 selects to output the selected entry in the register renaming mapping table RegMapT1.

As shown in FIG. 3B, when the processor operates in the single-threading mode and is suited to the extended general-purpose register set, the single thread T0 uses the extended general-purpose register set of the X86 instruction set. The above-mentioned register renaming mapping tables RegMapT0 and RegMapT1 are combined to obtain a new register renaming mapping table RegMapT0', and correspond to two parts of the new register renaming mapping table RegMapT0', respectively, i.e., register renaming mapping table RegMapT0' (1) corresponding to the first 16 general-purpose registers and register renaming mapping table RegMapT0' (2) corresponding to the last 16 general-purpose registers. In this way, resource waste due to the register renaming mapping table RegMapT1 being in the idle state can be avoided.

Therefore, for "IsT1||(ExtMode && LRN[4])", when the current processor is in the single-threading mode and suited to the extended general-purpose register set, the value of ExtMode is "1", and values of IsT1 and LRN[4] are the same. That is, when the selected entry in the register renaming mapping table RegMapT0' (1) (i.e., the original register renaming mapping table RegMapT0) is selected to be output, IsT1 and LRN[4] are both "0", and the value of "IsT1||(ExtMode && LRN[4])" is "0". When the selected entry in the register renaming mapping table RegMapT0' (2) (i.e., the original register renaming mapping table RegMapT1) is selected to be output, IsT1 and LRN[4] are both "1", and the value of "IsT1|| (ExtMode && LRN[4])" is "1".

Switching and control between "two-threading mode+ non-extended general-purpose register set" and "single-threading mode+extended general-purpose register set" may be realized by "IsT1||(ExtMode && LRN[4])".

The foregoing embodiment is described by taking for example that the register renaming mapping tables are reused in the process of switching between different instruction execution modes, however, the embodiments of the present disclosure are not limited to reuse of the hardware source register renaming mapping table. In some embodiments, the resource (e.g., a logic circuit (e.g., a reservation station or re-order buffer (ROB) or various storage queues)) independently used for a thread in the SMT mode may be used for one or more threads actually running currently in the processor in a less-threading mode (e.g., the single-threading mode).

Figure 4:
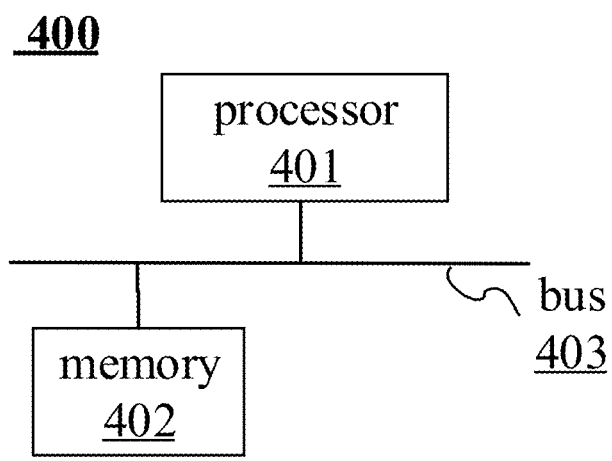
FIG. 4 illustrates a schematic diagram of an electronic apparatus according to at least one embodiment of the present disclosure.

At least one embodiment of the present disclosure further provides a schematic diagram of an electronic apparatus. As shown in FIG. 4, the electronic apparatus 400 according to the embodiment of the present disclosure may include a processor 401 and a memory 402. The processor 401 and the memory 402 may be coupled and interconnected by a bus 403.

The processor 401 is a processor according to any embodiment of the present disclosure and may perform various actions and various kinds of processing according to a program or code stored on the memory 402. The processor 401 may be an integrated circuit (IC) chip and is capable of signal processing, e.g., may be implemented as a system on chip (SoC).

The memory 402 stores computer-executable instructions, where the computer-executable instructions, when executed by the processor 401, implement the method for adjusting an instruction pipeline provided in at least one embodiment of the present disclosure. The memory 402 may be a volatile memory or a non-volatile memory, or may include both of the volatile and non-volatile memories. The non-volatile memory may be a read only memory (ROM), a programmable read-only memory (PROM), an erasable programmable read-only memory (EPROM), an electrically erasable programmable read-only memory (EEPROM), or a flash memory. The volatile memory may be a random access memory (RAM) which serves as an external cache. By exemplary but non-limiting description, many forms of RAMs can be used, such as a static random access memory (SRAM), a dynamic random access memory (DRAM), a synchronous dynamic random access memory (SDRAM), a double-data-rate synchronous dynamic random-access memory (DDRSDRAM), an enhanced synchronous dynamic random access memory (ESDRAM), a synchronous link dynamic random access memory (SLDRAM), and a direct memory bus random access memory (DRRAM). It should be noted that the memory used in the method described herein is intended to include but be noted limited to these and any other suitable type of memories.

The electronic apparatus may include an input/output unit, a communication unit, and the like as needed, which will not be limited in the embodiments of the present disclosure. The electronic apparatus may be implemented as a personal computer, a laptop, a mobile phone, a Pad, a server, etc. The electronic apparatus may also flexibly select a running mode when running different applications to increase the utilization rate of hardware resources and improve the system efficiency.

For the present disclosure, the following points need to be noted:

(1) The accompanying drawings in the embodiments of the present disclosure only involve structures involved in the embodiments of the present disclosure, and other structures may be designed as usual.

(2) The embodiments of the present disclosure and the features in the embodiments can be combined with one another to derive new embodiments without conflict.

The foregoing are merely descriptions of the exemplary embodiments of the present disclosure and are not meant to limit the protection scope of the present disclosure. The protection scope of the present disclosure is defined by the appended claims.

The invention claimed is:

1. An instruction execution method for a processor, comprising:
   switching a pipeline architecture of the processor between a first instruction execution mode and a second instruction execution mode according to a selection signal,
   wherein:
   the first instruction execution mode supports N threads and is suitable for a first general-purpose register set of an instruction set, and the second instruction execution mode supports M thread or threads and is suitable for a second general-purpose register set of the instruction set,
   the first general-purpose register set is smaller than the second general-purpose register set, M and N are positive integers, and N is greater than M, and
   the switching the pipeline architecture of the processor between the first instruction execution mode and the second instruction execution mode according to the selection signal comprises:
      in response to a first selection sub-signal for switching from the first instruction execution mode to the second instruction execution mode, combining N first-type register renaming mapping tables for the N threads to obtain M second-type register renaming mapping tables for the M threads, and
      in response to a second selection sub-signal for switching from the second instruction execution mode to the first instruction execution mode, splitting the M second-type register renaming mapping tables for the M threads to obtain the N first-type register renaming mapping tables for the N threads,
      wherein each of the second-type register renaming mapping tables includes at least two first-type register renaming mapping tables, and the selection signal includes the first selection sub-signal and the second selection sub-signal.

2. The instruction execution method according to claim 1, wherein the switching the pipeline architecture of the processor between the first instruction execution mode and the second instruction execution mode according to the selection signal further comprises:
   using the selection signal to control a multiplex selection device to perform the switching between the N first-type register renaming mapping tables for the N threads and the M second-type register renaming mapping tables for the M threads.

3. The instruction execution method according to claim 1, wherein the first-type register renaming mapping tables and the second-type register renaming mapping tables are each of a random addressed memory architecture.

4. The instruction execution method according to claim 1, wherein the first general-purpose register set is a non-extended general-purpose register set of the instruction set, and the second general-purpose register set is an extended general-purpose register set of the instruction set.

5. The instruction execution method according to claim 4, wherein the instruction set comprises a complex instruction set or a reduced instruction set.

6. The instruction execution method according to claim 1, wherein M is 1, and N is 2, 4, or 8.

7. The instruction execution method according to claim 6, wherein a number of general-purpose registers in the first general-purpose register set is ½, ¼, or ⅛ of a number of general-purpose registers in the second general-purpose register set.

8. A processor, comprising:
   a pipeline architecture, and
   a switching unit configured to switch the pipeline architecture of the processor between a first instruction execution mode and a second instruction execution mode according to a selection signal,
   wherein:
   the first instruction execution mode supports N threads and is suitable for a first general-purpose register set of an instruction set, and the second instruction execution mode supports M thread or threads and is suitable for a second general-purpose register set of the instruction set,
   the first general-purpose register set is smaller than the second general-purpose register set, M and N are positive integers, and N is greater than M,
   the pipeline architecture comprises N first-type register renaming mapping tables for the N threads, and
   switching the pipeline architecture of the processor between the first instruction execution mode and the second instruction execution mode according to the selection signal comprises:
      in response to a first selection sub-signal for switching from the first instruction execution mode to the second instruction execution mode, combining N first-type register renaming mapping tables for the N threads to obtain M second-type register renaming mapping tables for the M threads, and
      in response to a second selection sub-signal for switching from the second instruction execution mode to the first instruction execution mode, splitting the M second-type register renaming mapping tables for the M threads to obtain the N first-type register renaming mapping tables for the N threads,
      wherein each of the second-type register renaming mapping tables includes at least two first-type register renaming mapping tables, and the selection signal includes the first selection sub-signal and the second selection sub-signal.

9. The processor according to claim 8, wherein the switching unit comprises a multiplex selection device and is configured to use the selection signal to control the multiplex selection device to perform switching between the N first-type register renaming mapping tables for the N threads and the M second-type register renaming mapping tables for the M threads.

10. The processor according to claim 8, wherein the first-type register renaming mapping tables and the second-type register renaming mapping tables are each of a random addressed memory architecture.

11. The processor according to claim 8, wherein M is 1, and N is 2, 4, or 8.

12. The processor according to claim 11, wherein a number of general-purpose registers in the first general-purpose register set is ½, ¼, or ⅛ of a number of general-purpose registers in the second general-purpose register set.

13. An electronic apparatus, comprising a processor, and the processor comprising:
   a pipeline architecture, and
   a switching unit configured to switch the pipeline architecture of the processor between a first instruction execution mode and a second instruction execution mode according to a selection signal,
   wherein:
   the first instruction execution mode supports N threads and is suitable for a first general-purpose register set of an instruction set, and the second instruction execution mode supports M thread or threads and is suitable for a second general-purpose register set of the instruction set, the first general-purpose register set is smaller than the second general-purpose register set, M and N are positive integers, and N is greater than M, the pipeline architecture comprises N first-type register renaming mapping tables for the N threads, and switching the pipeline architecture of the processor between the first instruction execution mode and the second instruction execution mode according to the selection signal comprises:

in response to a first selection sub-signal for switching from the first instruction execution mode to the second instruction execution mode, combining N first-type register renaming mapping tables for the N threads to obtain M second-type register renaming mapping tables for the M threads, and in response to a second selection sub-signal for switching from the second instruction execution mode to the first instruction execution mode, splitting the M second-type register renaming mapping tables for the M threads to obtain the N first-type register renaming mapping tables for the N threads, wherein each of the second-type register renaming mapping tables includes at least two first-type register renaming mapping tables, and the selection signal includes the first selection sub-signal and the second selection sub-signal.

14. The electronic apparatus according to claim 13, wherein the switching unit comprises a multiplex selection device and is configured to use the selection signal to control the multiplex selection device to perform switching between the N first-type register renaming mapping tables for the N threads and the M second-type register renaming mapping tables for the M threads.

15. The electronic apparatus according to claim 13, wherein the first-type register renaming mapping tables and the second-type register renaming mapping tables are each of a random addressed memory architecture.

16. The electronic apparatus according to claim 13, wherein M is 1, and N is 2, 4, or 8.

17. The electronic apparatus according to claim 16, wherein a number of general-purpose registers in the first general-purpose register set is ½, ¼, or ⅛ of a number of general-purpose registers in the second general-purpose register set.

* * * * *